May 20, 1924.

P. B. CAMP

WINDING MECHANISM

Filed Aug. 6, 1923

1,494,414

Inventor:
Percy B. Camp

By Gillson & Mann
Attys.

Patented May 20, 1924.

1,494,414

UNITED STATES PATENT OFFICE.

PERCY B. CAMP, OF MAYWOOD, ILLINOIS, ASSIGNOR TO UNIVERSAL DRAFT GEAR ATTACHMENT COMPANY, A CORPORATION OF ILLINOIS.

WINDING MECHANISM.

Application filed August 6, 1923. Serial No. 656,100.

*To all whom it may concern:*

Be it known that I, PERCY B. CAMP, a citizen of the United States, and resident of Maywood, county of Cook, and State of Illinois, have invented certain new and useful Improvements in Winding Mechanism, of which the following is a specification, and which are illustrated in the accompanying drawings, forming a part thereof.

This invention relates to winding mechanisms particularly adapted for hand brakes on railway cars, and has among its objects to protect the mechanism from dirt, ice, etc., while leaving it open and accessible at all times; to provide a hand lever that is normally disconnected from the shaft and folded in an out-of-the-way position, but which can be readily extended and engaged with the shaft for winding; to permit the hand lever to be used for releasing the mechanism after the former has released the shaft and yet make it possible to fold the hand lever without releasing the mechanism.

Further objects and advantages of the invention will become apparent as the description is read in connection with the accompanying drawings in which Fig. 1 is a fragmentary side elevation showing the winding mechanism applied to a hand brake of a gondola car;

Figure 1:
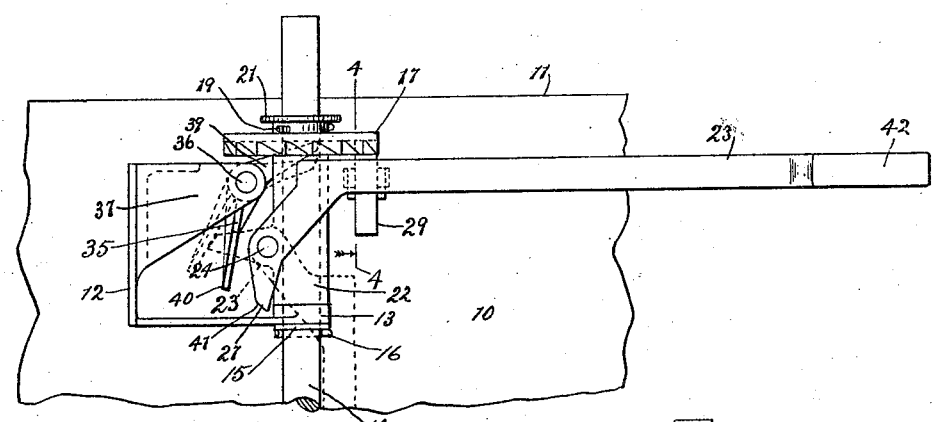
Figure 3:
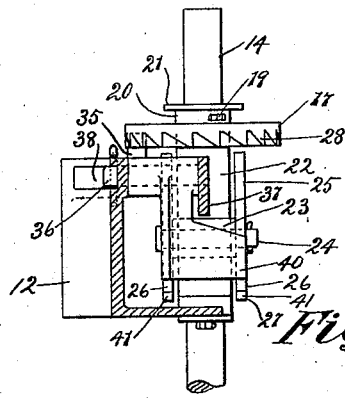
Fig. 3 is a sectional view on the line 3—3 of Fig. 2.
Figure 2:
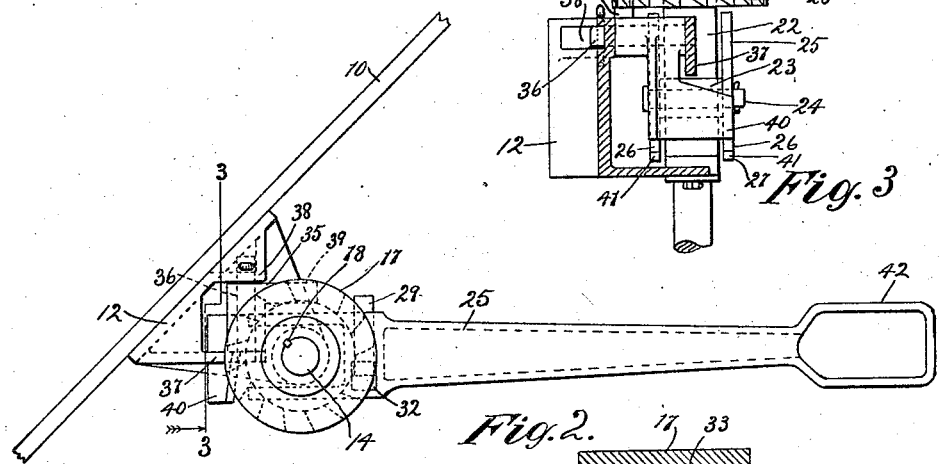
Fig. 2 is a plan view of the mechanism shown in Fig. 1.
Figure 4:
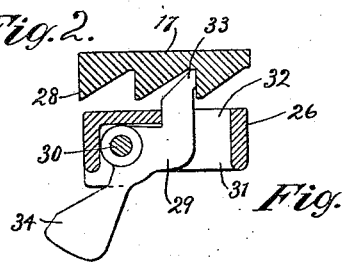
Fig. 4 is a sectional view on the line 4—4 of Fig. 1.

Referring to Figs. 1 and 2 the reference numeral 10 indicates a fragment of the end of a gondola car of which the reference numeral 11 represents the upper edge. A bracket 12 is secured to the car and provides a bearing 13 in which a shaft 14, here illustrated as a brake staff, is journaled. Just below the bearing 13 the shaft is equipped with a washer 15 held in place by a pin, or other suitable fastening, 16.

A ratchet wheel 17 is suitably placed on the shaft, and is here illustrated as located above the bearing 13. The ratchet wheel may be keyed to the shaft as indicated at 18 and is preferably also secured by a pin 19 inserted through a flange 20 on the ratchet wheel and the shaft. In order to prevent injury to the brakeman by contact with the ends of the pin 19, a flange 21 is provided to cover from above and extend radially beyond the ends of the pin.

Between the ratchet wheel and the bearing 13, in the present illustration, is a fulcrum member, here shown in the form of a sleeve 22 swiveled on the shaft and freely rotatable thereabout. At one side the sleeve is equipped with a boss 23 which receives a pivot 24 by which a hand lever 25 is pivoted and fulcrumed on the sleeve. Preferably the hand lever is bifurcated and the furcations 26 straddle the sleeve 22. Preferably also the furcations are at an angle to the body of the arm 25 substantially as shown in Fig. 1, and they extend beyond the pivot to form a short arm or arms 27 for releasing the winding mechanisms.

Driving engagement is effected between the ratchet wheel and the hand lever by providing teeth 28 on the ratchet wheel and equipping the hand lever with a pawl 29. Preferably the teeth are on the under side of the ratchet wheel and the pawl is pivoted, as shown at 30, in a pocket 31 of the hand lever which opens through a passage 32 in the top of the lever and permits the toothed end 33 to engage with the ratchet teeth 28. The other end 34 of the pawl is preferably weighted and serves to normally hold the end 33 in position to engage the ratchet teeth.

The winding mechanism may be held against unwinding in any suitable manner, but I prefer to make use of a pawl 35, here shown as mounted on a pin 36 carried by arms 37 and 38 on the bracket 12. The pawl is also preferably in the form of a bell crank, one arm 39 of which serves to engage the teeth 28, and the other arm 40 is weighted and serves to normally hold the pawl in engagement with the teeth. The arm 40, however, is of sufficient length that it may be engaged by the cam surfaces 41 on the short arms 27 of the hand lever whereby the pawl may be released to permit the mechanism to unwind.

The hand lever is preferably provided with a loop 42 at its ends to receive the hand of the brakeman. Such a loop will protect the hand from being caught between the lever and the end of the car and will also prevent the hand from slipping off the lever thereby providing the brakeman with a firm and safe grasp for his right hand, while operating the mechanism.

The normal position of the mechanism is shown in dotted lines in Fig. 1. When it is desired to apply the brakes the brakeman raises the hand lever to the solid line position and the pawl 29 effects a driving connection with the ratchet wheel 17. He then operates the lever back and forth in the usual manner until the shaft 14 is wound to the extent desired. If the brakes are to be left applied he swings the hand lever to a position in which the pawl 35 does not lie in the path of the cam surfaces 41 and then drops the hand lever, which assumes its folded position. If the brakes are to be released he swings the hand lever to a position in which the pawl 35 does lie in the path of the cam surfaces 41, and releases the lever. The weight and leverage of the longer arm will usually be sufficient to swing the pawl 35 and release the ratchet wheel 17, but if, for any reason, this did not occur, a slight pressure on the long arm will be sufficient to effect a release.

The ratchet wheel 17 will protect the teeth and the pawls from falling material that may form a part of the load in the car, or accumulate in any other way, thus preventing the teeth and the pawls from being fouled with dirt, ice, and the like, and preserving them in operative condition at all times. Moreover, should anything go wrong with the mechanism the space below the ratchet wheel being entirely open, all the parts are readily accessible for inspection, cleaning, repairing or adjusting. This is a very important advantage over winding mechanisms in which the ratchet wheels have teeth on their upper sides or in which the ratchet wheels and pawls are encased in such a manner as to permit an accumulation of dirt or ice, and prevent access thereto.

The angle or curve in the long arm of the hand lever permits it to lie close to the shaft when in folded position, and at the same time enables it to bring the pawl 29 into proper relation with the ratchet wheel when raised to winding position. It also permits the short arms to take a convenient position in relation to the pawl 35 permitting the latter to freely engage the ratchet wheel during the winding operation or thereafter if the hand lever is swung to the proper position, and also enabling the cam surfaces 41 to be readily brought to bear on the lower arm 40 of the pawl to forcibly release the winding mechanism.

I have used terms and drawings for the purpose of illustration to the end that the disclosure may be clearly understood, but I do not wish to be limited except as is made necessary by the prior art.

I claim as my invention:

1. In a device of the class described, the combination of a shaft, a ratchet wheel thereon having teeth on one side, a hand lever, a universal connection between the hand lever and the shaft, a pawl carried by the hand lever in position to cooperate with the ratchet wheel when the lever is in winding position, means to prevent the shaft from unwinding and means carried by the hand lever for rendering the last named means inoperative.

2. In a device of the class described, the combination of a shaft, a ratchet wheel thereon having teeth on one side, a hand lever, a universal connection between the hand lever and the shaft, a pawl carried by the hand lever in position to cooperate with the ratchet wheel when the lever is in winding position, a second pawl adapted to lock said shaft against unwinding, and an extension on said hand lever adapted to release said second pawl.

3. In a device of the class described, the combination, of an upright shaft, a ratchet wheel secured to the shaft and having teeth on its lower side, a sleeve rotatably mounted on said shaft below the ratchet wheel, a hand lever pivotally mounted on said sleeve and a yielding pawl carried by said hand lever and adapted to engage said teeth when the hand lever is in winding position.

4. In a device of the class described, the combination of a shaft, a ratchet wheel secured thereto, a fulcrum member journaled on said shaft, a curved hand lever pivoted to said fulcrum member below the ratchet wheel and a pawl on the hand lever adapted to engage with the ratchet wheel.

5. In a device of the class described, the combination of a shaft, a ratchet wheel secured thereto, a fulcrum member journaled on said shaft, a curved hand lever pivoted to said fulcrum member, a pawl on the hand lever adapted to engage with the ratchet wheel, a second pawl adapted to engage the ratchet wheel and prevent unwinding and an extension on the hand lever on the opposite side of its pivot from the first pawl adapted to release the second pawl.

6. In a device of the class described, the combination of a shaft, a ratchet wheel fixed thereon, a sleeve swiveled on said shaft, a bifurcated lever straddling said sleeve and pivoted thereto, said lever having a long arm and a short arm, means carried by the long arm to engage the ratchet wheel and effect the winding of the shaft, means to prevent unwinding of the shaft, said last named means being within the path of the short arm of the lever when the long arm is moved to release the ratchet wheel.

7. In a device of the class described, the combination with a car, of a bracket secured thereto, an upright shaft journaled in the bracket, a ratchet wheel secured to the shaft adjacent to the bracket, and having teeth on its lower side, a sleeve swiveled on the shaft below the ratchet wheel, a hand lever pivoted thereon and divided by the pivot into a long arm and a short arm, a pawl carried by the long arm to cooperate with the ratchet wheel and effect a winding of the shaft and a second pawl adapted to prevent unwinding of the shaft and to be released by the short arm of the lever.

8. In a device of the class described, the combination of a shaft, a ratchet wheel secured thereto and having teeth on its lower side, a pawl adapted to engage said teeth to wind the shaft, a second pawl adapted to engage said teeth to prevent unwinding of the shaft, and a hand lever articulated to the shaft to swing between a winding position at an angle thereto and an inoperative position extending along the shaft, said lever being adapted in one position to engage the first pawl with the ratchet and in another position to disengage the second pawl from the ratchet.

PERCY B. CAMP.